(12) United States Patent
Wang et al.

(10) Patent No.: US 10,349,035 B2
(45) Date of Patent: Jul. 9, 2019

(54) AUTOMATICALLY SCANNING AND REPRESENTING AN ENVIRONMENT HAVING A PLURALITY OF FEATURES

(71) Applicant: ABB SCHWEIZ AG, Baden (CH)

(72) Inventors: Jianjun Wang, West Hartford, CT (US); Biao Zhang, West Hartford, CT (US); Carlos Martinez, South Windsor, CT (US); Carlos W. Morato, Avon, CT (US); Remus Boca, Simsbury, CT (US)

(73) Assignee: ABB Schweiz AG, Baden (CH)

( * ) Notice: Subject to any disclaimer, the term of this patent is extended or adjusted under 35 U.S.C. 154(b) by 198 days.

(21) Appl. No.: 14/941,826

(22) Filed: Nov. 16, 2015

(65) Prior Publication Data

US 2017/0142403 A1    May 18, 2017

(51) Int. Cl.
*G06K 9/00* (2006.01)
*G06T 7/73* (2017.01)
(Continued)

(52) U.S. Cl.
CPC ....... *H04N 13/204* (2018.05); *G06K 9/00791* (2013.01); *G06T 7/75* (2017.01);
(Continued)

(58) Field of Classification Search
None
See application file for complete search history.

(56) References Cited

U.S. PATENT DOCUMENTS

| 7,069,124 B1 * | 6/2006 | Whittaker | G05D 1/0225 701/28 |
| 2010/0274387 A1 * | 10/2010 | Pitzer | G06N 7/005 700/246 |

(Continued)

FOREIGN PATENT DOCUMENTS

| WO | WO 2013098459 A1 * | 7/2013 | ............ E21D 20/00 |
| WO | WO-2013098459 A1 * | 7/2013 | ............ E21D 20/00 |
| WO | 2015106799 A1 | 7/2015 | |

OTHER PUBLICATIONS

Wang et al., "Automatically Scanning and Representing an Environment With Collision Avoidance" . U.S. Appl. No. 14/941,838, filed Nov. 16, 2015.

(Continued)

*Primary Examiner* — William C Vaughn, Jr.
*Assistant Examiner* — Lindsay J Uhl
(74) *Attorney, Agent, or Firm* — J. Bruce Schelkopf; Taft Stettinius & Hollister LLP

(57) ABSTRACT

Automatic scanning and representing an environment having a plurality of features, for example, includes scanning the environment along a scanning path, interspersing a plurality of localized scanning of the plurality of features in the environment during the scanning along the scanning path of the environment wherein the interspersed localized scanning of the plurality of features in the environment being different from the scanning the environment along the scanning path, and obtaining a representation of at least a portion of the environment based on the scanning of the environment and the interspersed localized scanning of the plurality of features in the environment.

16 Claims, 9 Drawing Sheets

(51) Int. Cl.
*H04N 5/232* (2006.01)
*H04N 13/204* (2018.01)

(52) U.S. Cl.
CPC ......... *H04N 5/232* (2013.01); *G06K 9/00201* (2013.01); *G06T 2207/10016* (2013.01); *G06T 2207/10028* (2013.01); *G06T 2207/30252* (2013.01)

(56) References Cited

U.S. PATENT DOCUMENTS

| | | | |
|---|---|---|---|
| 2012/0239191 A1* | 9/2012 | Versteeg | G06N 3/004 700/246 |
| 2013/0330467 A1* | 12/2013 | Bond | E21D 11/10 427/8 |
| 2015/0198041 A1 | 7/2015 | Bond et al. | |
| 2015/0268058 A1 | 9/2015 | Samarasekera et al. | |

OTHER PUBLICATIONS

Wang et al., "Facilitating Robot Positioning". U.S. Appl. No. 14/941,823, filed Nov. 16, 2015.
Wang et al., "Three-Dimensional Visual Servoing for Robot Positioning"; U.S. Appl. No. 14/941,832, filed Nov. 16, 2015.
Bonchis et al., Robotic Explosive Charging in Mining and Construction Applications, IEEE Transactions on Automation Science and Engineering, vol. 11, No. 1, Jan. 2014, 6 pages.
International Search Report and Written Opinion for PCT International Application Serial No. PCT/US2016/62070, dated Feb. 2, 2017, 12 pages.

\* cited by examiner

AUTOMATICALLY SCANNING AND REPRESENTING AN ENVIRONMENT HAVING A PLURALITY OF FEATURES

FIELD OF THE DISCLOSURE

This disclosure relates generally to imaging environments, and more specifically, to automatically scanning and representing an environment having a plurality of features such as a rock wall having a plurality of spaced-apart holes for receiving charges for mining.

BACKGROUND

In the charging process for underground mine production, a primer and detonator are inserted into holes drilled in the walls and explosive material is pumped into holes. Operators need to work on the charging process at the production front. The charging process includes preparing wires, assembling detonator packages, inserting the charge hose into each of the holes, pumping the explosive into each of the holes, and retracting the hose after the explosive is pumped into the holes. The process is not safe, ergonomic and cost efficient. The production front environment also contains many hazards, such as wall collapses, accidental explosions, rock bursts, etc.

An attempt at automating the charging process is disclosed in "Robotic Explosive Charging In Mining And Construction Applications" by A. Bonchis, E. Duff, J. Roberts, and M. Bosse, IEEE Trans. Autom. Sci. Eng., vol. 11, no. 1, pp. 245-250, January 2014.

There is a need for further imaging of environments, and more specifically, to automatically scanning and representing an environment having a plurality of features such as scanning and representing a rock wall having a plurality of spaced-apart holes for receiving charges for mining.

SUMMARY

In a first aspect, the present disclosure provides a computer-implemented method which includes scanning an environment along a scanning path, interspersing a plurality of localized scanning of a plurality of features in the environment during the scanning along the scanning path of the environment wherein the interspersed localized scanning of the plurality of features in the environment being different from the scanning the environment along the scanning path, and obtaining a representation of at least a portion of the environment based on the scanning of the environment and the interspersed localized scanning of the plurality of features in the environment.

In a second aspect, the present disclosure provides a system which includes a memory, and a physical processor in communication with the memory, wherein the system is configured to perform a method. The method includes scanning an environment along a scanning path, interspersing a plurality of localized scanning of a plurality of features in the environment during the scanning along the scanning path of the environment wherein the interspersed localized scanning of the plurality of features in the environment being different from the scanning the environment along the scanning path, and obtaining a representation of at least a portion of the environment based on the scanning of the environment and the interspersed localized scanning of the plurality of features in the environment.

In a third aspect, the present disclosure provides a computer program product. The computer program product includes a non-transitory computer readable storage medium readable by a processor and storing instructions for execution by the processor for performing a method which includes scanning an environment along a scanning path, interspersing a plurality of localized scanning of a plurality of features in the environment during the scanning along the scanning path of the environment wherein the interspersed localized scanning of the plurality of features in the environment being different from the scanning the environment along the scanning path, and obtaining a representation of at least a portion of the environment based on the scanning of the environment and the interspersed localized scanning of the plurality of features in the environment.

Additional features and advantages are realized through the concepts of the present disclosure. Other embodiments and aspects of the disclosure are described in detail herein and are considered a part of the claims.

BRIEF DESCRIPTION OF THE DRAWINGS

Various aspects of the present disclosure are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

The present disclosure addresses and enhances, inter alia, the process of automatically scanning and representing an environment having a plurality of features. For example, where positional and detailed data regarding certain features of the environment are desired, the technique of the present disclosure may result in obtaining primarily the necessary positional and detailed data regarding the features more quickly compared to obtaining detailed data of the entire environment having the features. In one embodiment, the technique of the present disclosure may include a general scanning of the environment along with interspersed localized scanning of a plurality of features or region of interest in the environment during the general scanning of the environment. The general scanning of the environment and the localized scanning of the plurality of features may be different, for example, may be obtained at different locations, angles, or regions, at different resolutions, and/or at different speeds. A representation of at least a portion of the environment may be obtained or generated based on the scanning of the environment and the interspersed localized scanning of the plurality of features in the environment. As further described below, the technique of the present disclosure may be employed in robotic or automated charging of holes in mining wherein the environment may include a rock wall having a plurality of holes defining axes for receiving charges for mining.

Figure 1:
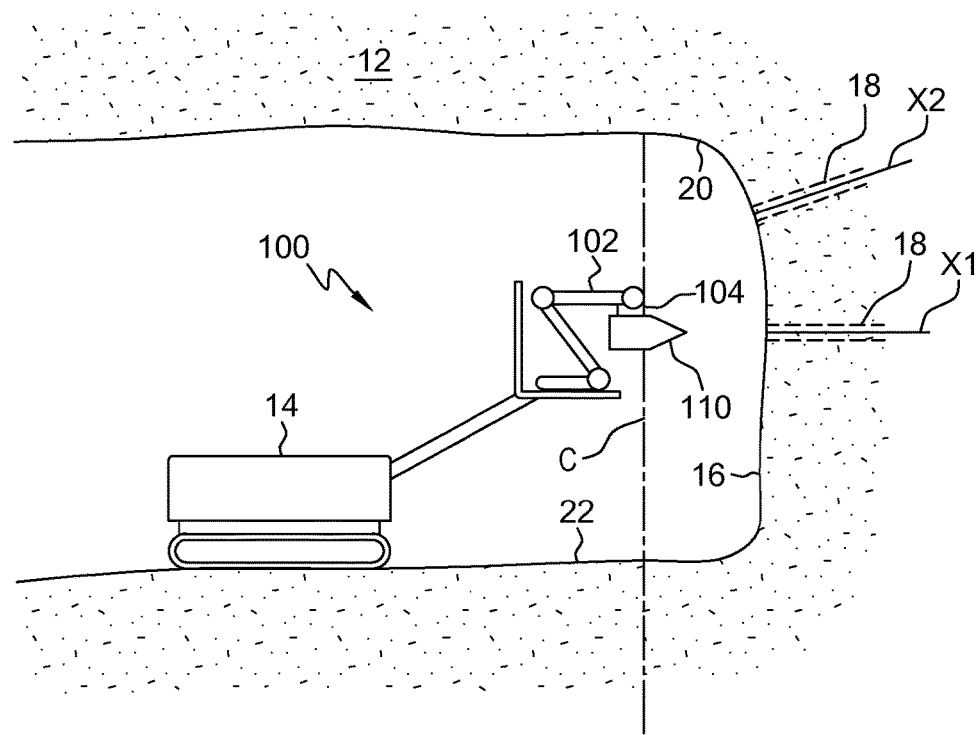
FIG. 1 is a diagrammatic illustration of an imaging system for scanning and representing an environment having a plurality of features in accordance with aspects of the present disclosure such as for representing a rock wall having a plurality of drill holes.
Figure 2:
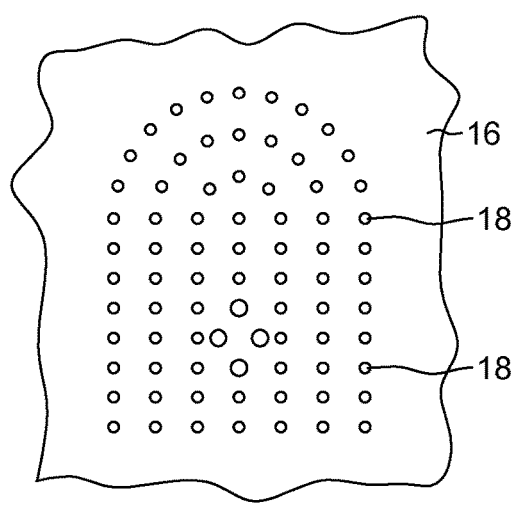
FIG. 2 is a front view of the wall of FIG. 1 illustrating the plurality of drill holes.

FIG. 1 illustrates one embodiment of an imaging system 100 in accordance with aspects of the present disclosure for imaging an environment. In this exemplary embodiment, imaging system 100 may be used with the charging of holes in mining. For example, imaging system 100 may be employed in underground mining 12 and may generally include a robot 102 having an imager or camera system 104 supported on a suitable mounting assembly or movable carrier 14 for imaging a wall 16 having a plurality of holes 18 (only two of which are illustrated in FIG. 1). As shown in FIG. 2, wall 16 may include a plurality of holes 18 defining a drill hole pattern. While reference to the imaging system is made in the context of robotic or automated charging of holes in mining, it will be readily appreciated by those skilled in the art that the technique of the present disclosure is applicable to other situations where imaging is needed of an environment with one or more features. In addition, imaging system 100, operable for imaging and locating a plurality of drill holes extending into a wall, may be part of a robotic system operable for charging the plurality of located holes.

Figure 3:
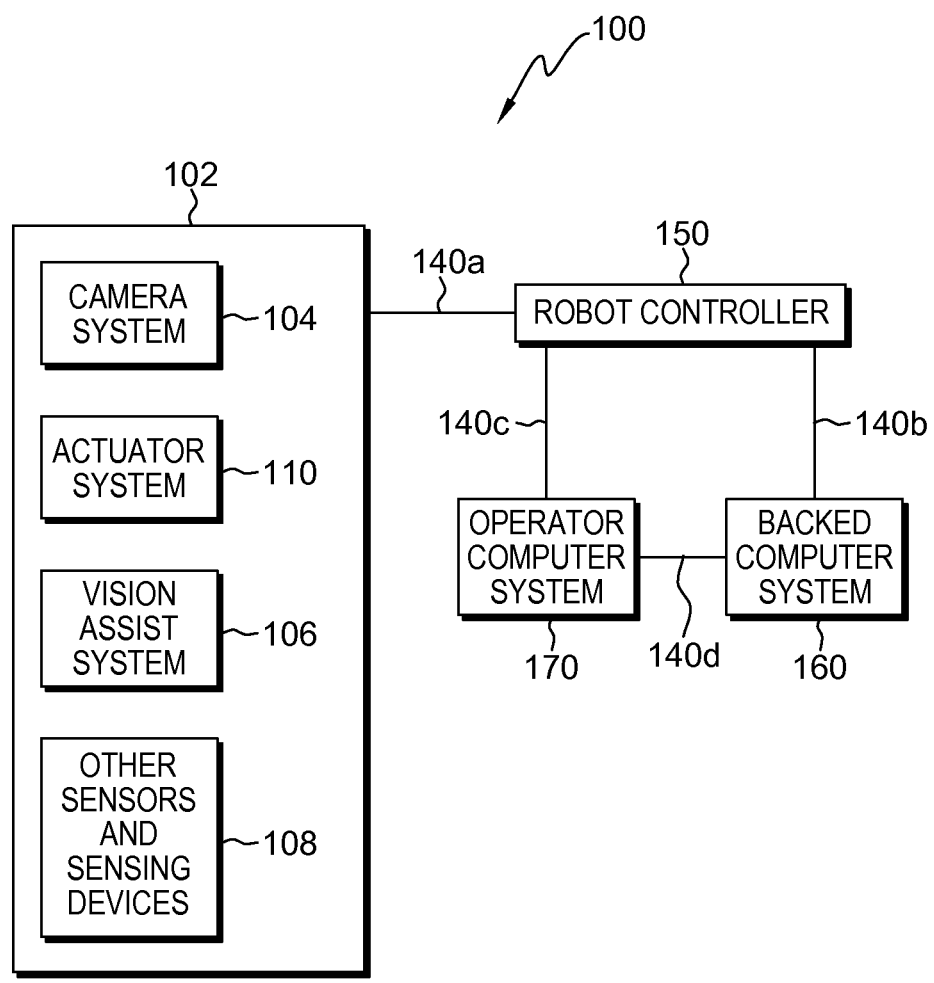
FIG. 3 is a block diagram of the imaging system of FIG. 1.

As shown in FIG. 3, imaging system 100 may generally include robot 102 operably connected to a robot controller 150, an operator computer system 170, and a backend computer system 160, which are operably coupled via communication links 140. Robot 102 may include camera system 104, an end effector or actuator 110, a vision assistance system 106, and other sensor/sensor devices 108. The components and operation of imaging system 100 are described in greater detail below.

Figure 4:
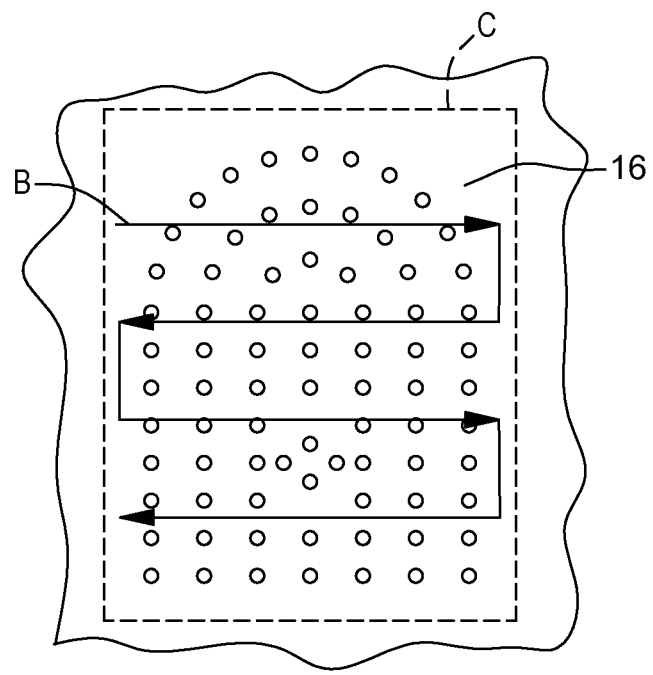
FIG. 4 is a front view of the wall illustrating the plurality of drill holes and a scanning path traversed by the robotic system of FIG. 1.

With reference to FIG. 4, a general scanning of an environment such as wall 16 may be along a scanning path B. For example, scanning path B may correspond to camera system 104 (FIG. 1) being scanned across a plane C (FIGS. 1 and 4) such as a plane generally parallel to wall 16 and with camera system 104 (FIG. 1) disposed generally perpendicular to wall 16. Scanning path B may include scanning about a non-fixed location such as a series of spaced-apart scanning path portions wherein camera system 104 moves across plane C at different heights from the ground 22 (FIG. 1). For example, camera system 104 may be operable for providing 2-dimensional, 3-dimensional, and/or depth-sensing imaging capabilities for obtaining images or representations including data regarding the spatial position and other geometric information of the environment in 3-dimensional space.

Figure 5:
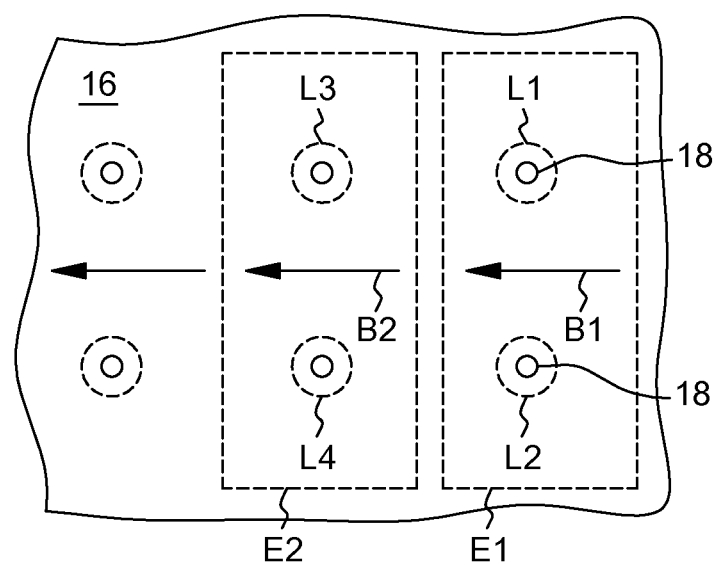
FIG. 5 is a front view of a portion of the wall illustrating a portion of the scanning path and a localized scanning traversed by the robotic system of FIG. 1.

Interspersed during the general scanning of the environment may be a plurality of localized scanning of a plurality of features in the environment. As shown in FIG. 5, interspersed during the scanning along scanning path B (FIG. 4) of wall 16 may be a plurality of localized scannings of a plurality of regions of interest such as the plurality of holes 18 in wall 16. For example, scanning may proceed along a portion B1 of the scanning path for imaging a first portion E1 of the environment such as wall 16. One or more of the plurality of features such as one or more holes 18 may be identified in the imaged first portion E1 of the environment. A scanning of one or more localized portions L1 and L2 of the environment having the identified one or more of the plurality of features in the first portion E1 of the environment is then performed. Thereafter, scanning is continued along a second portion of the scanning path B2 of a second portion E2 of the environment, and another one or more of the plurality of features such as hole 18 is identified. A scanning of one or more localized portions L3 and L4 of the environment having the identified one or more of the plurality of features in the second portion E2 of the environment is then performed. The process is then similarly continued along the remaining scanning path of the environment. The interspersed localized scanning of the plurality of features in the environment may be different from the scanning the environment along the scanning path.

Figure 6:
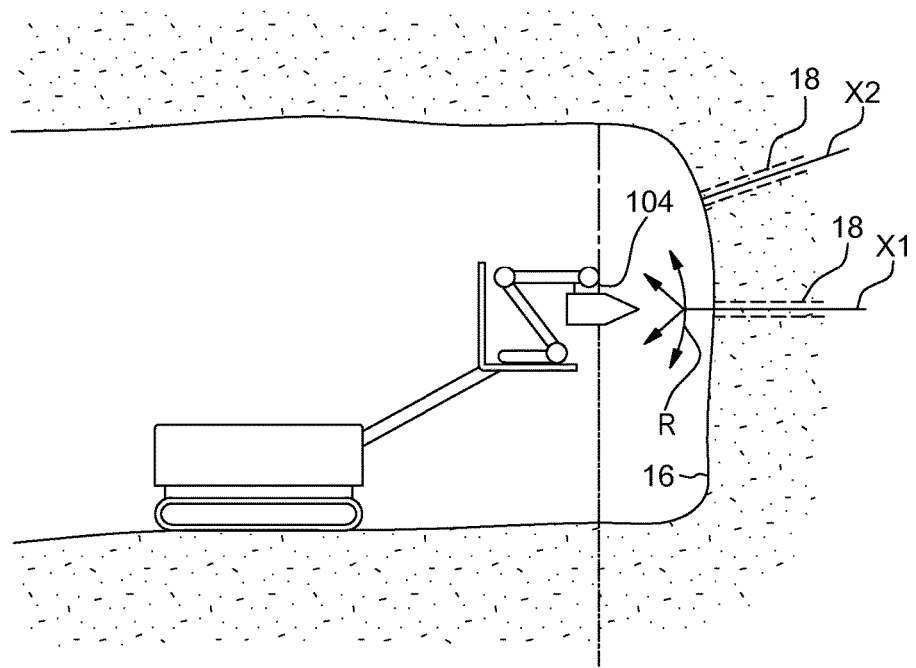
FIG. 6 is a diagrammatic illustration of the imaging system of FIG. 1 undertaking a localized scanning of a drill hole.

As shown in FIG. 6, localized scanning may include camera system 104 being operably moved or rotated about a generally fixed point or relatively small region or volume, e.g., in the directions of the illustrated double-headed arrows R in FIG. 6 to provide a localized imaging or representation of wall 16 and a hole 18 desirably from various angles.

In another aspect of the present disclosure, a predetermined drill hole map, used by an operators for drilling the holes in the wall, may be used in the imaging system for determining the locations of the holes for use in the localized scanning. For example, some of the plurality of the holes identified by the local scanning may be corresponded to and aligned with the holes in the predetermined drill hole map.

A representation of at least a portion of the environment may be obtained or generated based on the scanning of the environment and the interspersed localized scanning of the plurality of features in the environment. For example, a representation of at least a portion of the environment along the scanning path and including the localized scanning may include merging together data, e.g., using well-known 3D meshing algorithms or 3D point cloud processing system, or other suitable processing, from a plurality of images or data of portions of the environment such as the wall and the holes.

The representation of the environment from the scanning along the scanning path of the environment may be different from the localized scanning of features of the environment. For example, the scanning along the scanning path of the environment may be obtained with a first resolution different from the resolution of the localized scanning, and/or at a scanning speed different from the scanning speed of the localized scanning.

The technique of the present disclosure may include using the representation of at least a portion of the environment to determine an aspect of the plurality of features. For example, in connection with mining, as noted above in one embodiment the wall may include a plurality of elongated drilled holes which are to be filed or charged with an explosive. The detailed portions of the holes in the representation may be used to locate the holes in the wall and determine the angle or orientation in 3D space of axis X1 and X2 (FIG. 6) of the holes. Such detailed portions of the representation may be used with the robot and end effector to automatically install a charge in each drilled hole.

In another aspect, with reference to FIGS. 1 and 4, plane C is initially determined so that imaging of the environment avoids contact with the environment such as imaging of the rock wall having a plurality of spaced-apart holes for receiving charges while avoiding the rock wall, the ceiling, the ground and the sidewalls. For example, plane C may be determined using a pre scan to determine the scanning path as disclosed in U.S. patent application Ser. No. 14/941,838, filed Nov. 16, 2015 and entitled "Automatically Scanning And Representing An Environment With Collision Avoidance", the entire subject matter of this application being incorporated herein by reference.

Figure 7:
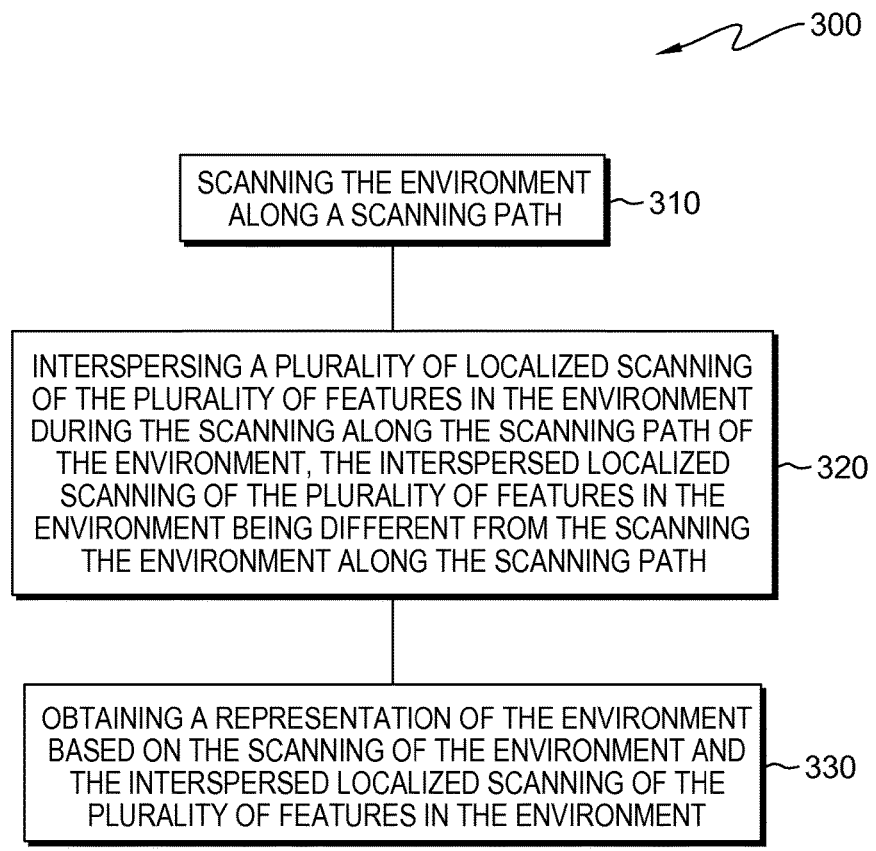
FIG. 7 is a flowchart of a method for scanning and representing an environment having a plurality of features in accordance with aspects of the present disclosure.

FIG. 7 illustrates a flowchart of a computer-implemented method 300, which may be implemented by imaging system 100, for automatically scanning and representing an environment having a plurality of features in accordance with aspects of the present disclosure. In this embodiment, computer-implemented method 300 includes at 310, scanning the environment along a scanning path, and at 320, interspersing a plurality of localized scanning of the plurality of features in the environment during the scanning along the scanning path of the environment wherein the interspersed localized scanning of the plurality of features in the environment being different from the scanning the environment along the scanning path. At 330, a representation of at least a portion of the environment is obtained based on the scanning of the environment and the interspersed localized scanning of the plurality of features in the environment.

Figure 8:
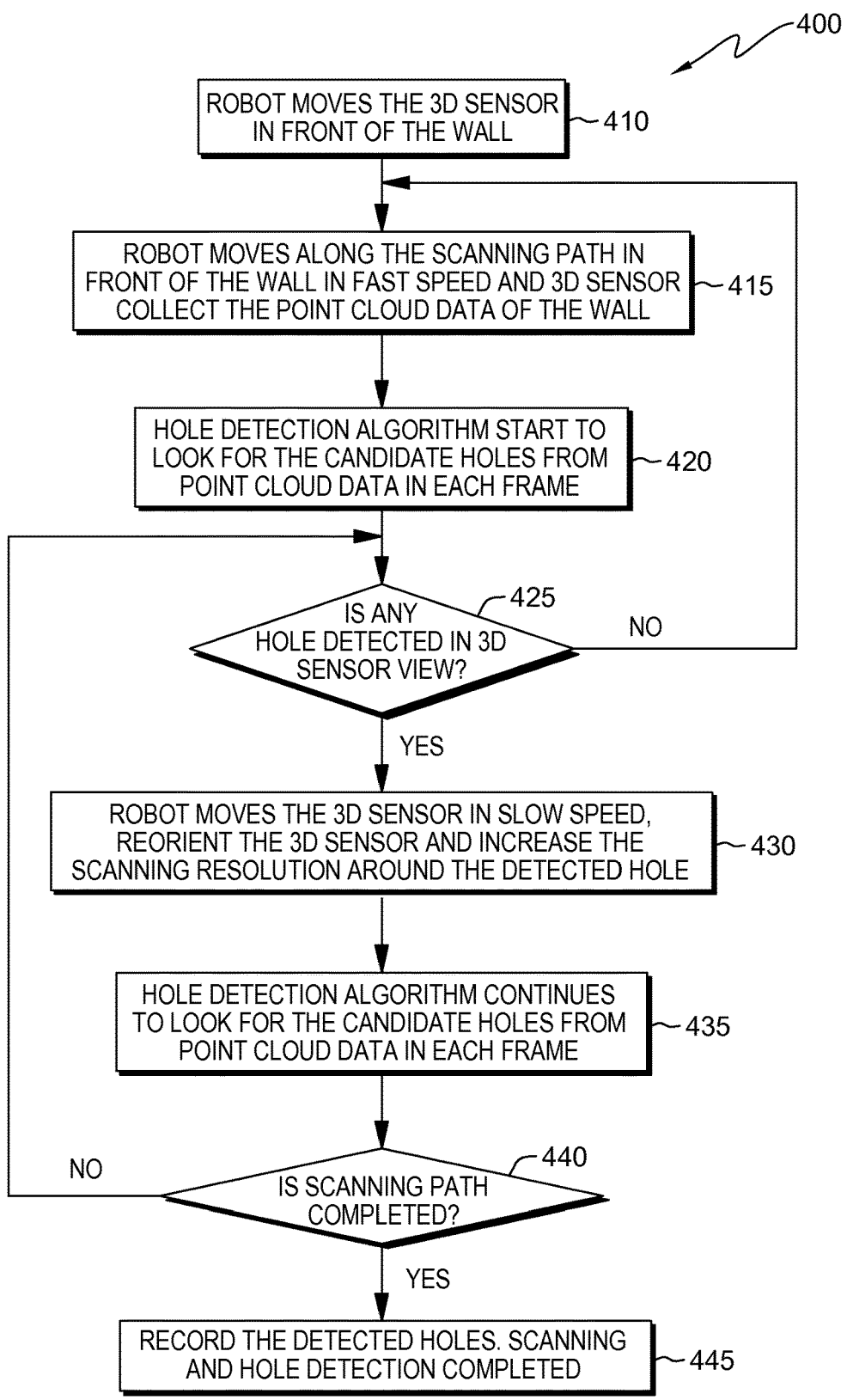
FIG. 8 is a flowchart of another method for automatically scanning and representing an environment having a plurality of features in accordance with aspects of the present disclosure.

FIG. 8 illustrates a flowchart of a computer-implemented method 400, which may be implemented by imaging system 100, for automatically scanning and representing an environment having a plurality of features in accordance with aspects of the present disclosure. In this embodiment, computer-implemented method 400 includes at 410, the robot moving and positioning the 3D sensor in front of the wall, and at 415, moving the robot along the scanning path in front of the wall at a first speed, e.g., fast speed, so that the 3D sensor collects point cloud data of the wall. At 420, a hole detection algorithm begins to look for candidate holes from the point cloud data in each frame. The criteria for determining from the point cloud data if a hole is a candidate hole can be the diameter of the hole, the depth of the hole, and/or the circularity of the hole. At 425, a determination is made of whether any hole is detected in the 3D sensor view. If not, the robot continues to move along the scanning path in front of the wall at the first speed and the 3D sensor collects point cloud data of the wall at 415. If a hole is detected at 425, then at 430, the robot moves the 3D sensor at a second speed, e.g., slow speed, reorients the 3D sensor and increases the scanning resolution around the detected hole. At 435, the hole detection algorithm continues to look for the candidate holes from the point cloud data in each frame. At 440, a determination is made of whether the scanning path has been completed. If not, the process returns to 425 to determine whether a hole is detected. Once the scanning path has been completed, the detected holes are recorded and the scanning and hole detection is completed at 445.

Figure 9:
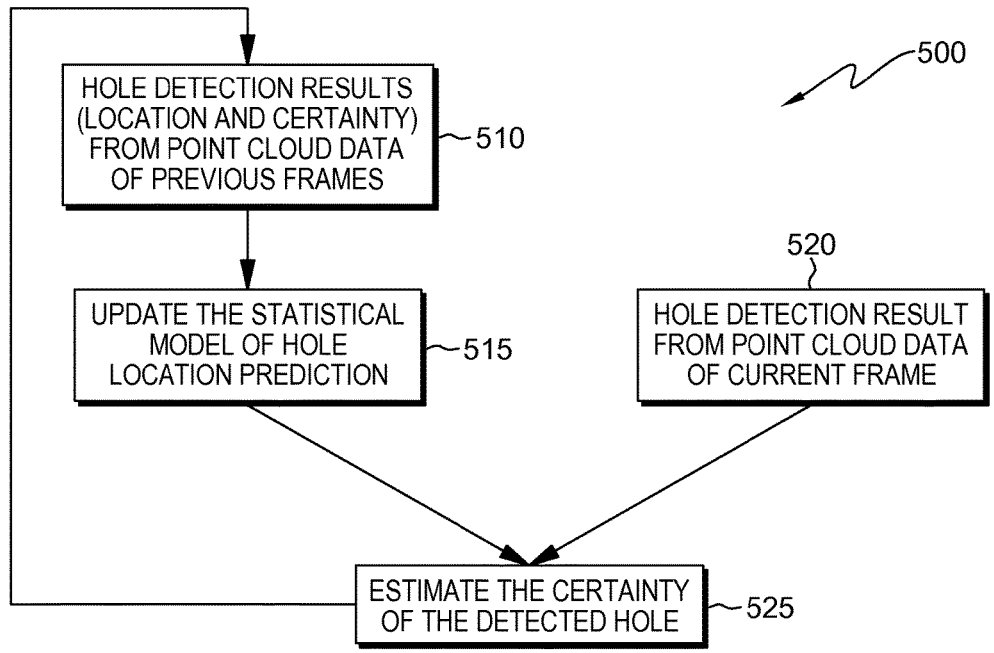
FIG. 9 is a flowchart of a method for estimating the certainty of the hole detection based on a plurality of frames in accordance with aspects of the present disclosure.

FIG. 9 illustrates a flowchart of a computer-implemented method 500, which may be implemented by imaging system 100, for estimating the certainty of the hole detection based on a plurality of frames in accordance with aspects of the present disclosure. In this embodiment, computer-implemented method 500 includes at 510, determining hole detection results (location and certainty) from point cloud data of previous frames, which is used at 515 for updating the statistical model of the hole location prediction, which is used along with the hole detection result from the point cloud data of the current frame at 520 to estimate the certainty of the detected hole at 525.

A drilling map defining the relative position of the drilled holes on a wall (such as shown in FIG. 2) may be used in a hole detection process to improve both the robustness of the hole detection to avoid the likelihood of false hole detection, and the increase the speed of the hole detection process.

Figure 10:
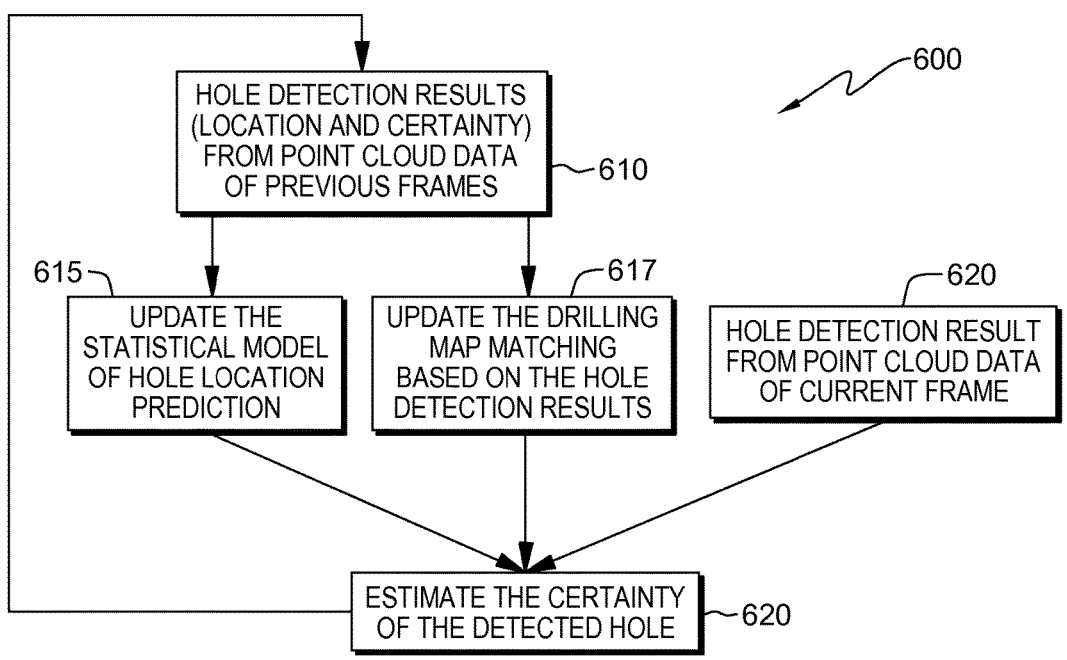
FIG. 10 is a flowchart of a method for estimating the certainty of the hole detection based on a plurality of frames and a drill map in accordance with aspects of the present disclosure.

FIG. 10 illustrates a flowchart of a computer-implemented method 600, which may be implemented by imaging system 100, for estimating the certainty of the hole detection based on a plurality of frames and based on a drilling map in accordance with aspects of the present disclosure. In this embodiment, computer-implemented method 600 includes at 610, determining hole detection results (location and certainty) from point cloud data of previous frames, which is used at 615 for updating the statistical model of the hole location prediction and at 617 updating the drilling map matching based on the hole detection results which are used along with the hole detection result from the point cloud data of the current frame at 620 to estimate the certainty of the detected hole at 625. As shown in FIG. 10, hole detection results from point cloud data of the current frame and the updated statistical model of hole location prediction based on the hole detection results (location and certainty) from point cloud data of previous frames are used to estimate the certainty of the detected hole. After several holes locations are recorded, they are used as anchor points to match the drilling map based on for example, pattern match method. Once the holes on the drilling map matches with the detected holes, the drilling map can be used to estimate the certainty of the detected hole with Hole detection result from point cloud data of current frame and the updated statistical model of hole location prediction based on the hole detection results, as shown in FIG. 10. In addition, the drilling map can be used to predict the appearance and location of the hole in the current frame, which can speed up hole detection process by reducing the searching region. The matching of the drilling map may be kept updated as the next hole locations are recorded. This may improve the drilling map matching accuracy and robustness.

Figure 11:
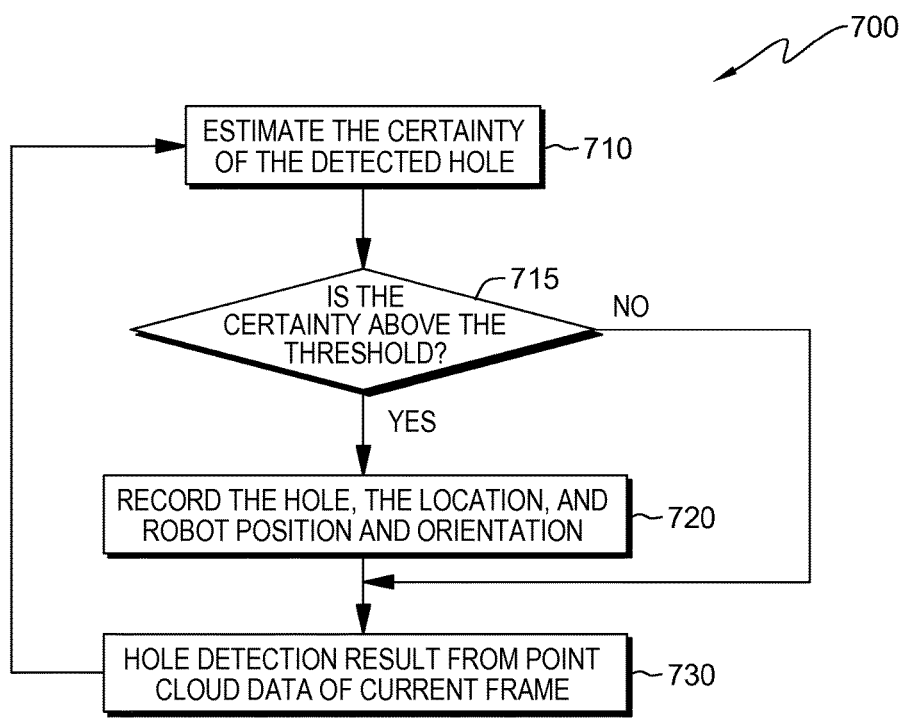
FIG. 11 is a flowchart of a method for checking the estimated certainty of the hole detection in accordance with aspects of the present disclosure.

FIG. 11 illustrates a flowchart of a computer-implemented method 700, which may be implemented by imaging system 100, for checking the estimated certainty of the hole detection in accordance with aspects of the present disclosure. In this embodiment, computer-implemented method 700 includes at 710 obtaining the estimate the certainty of the detected hole, and at 715 determining whether the certainty is above a threshold value. If the certainty is not above, then at 730, the next hole detection result from point cloud data if current frame is determined and the process returns to 710. If above the threshold value, at 720 the hole location and robot position and orientation are recorded, and at 730, the next hole detection result from point cloud data if current frame is determined and the process returns to 710. As shown in FIG. 11, if the certainty of the detected hole is above a certainty threshold, both the hole location and robot position and orientation are recorded. The robot position and orientation can be used to improve the accuracy of robot positioning based on the hole location detection result. For example, because there may be a large positioning error from the robot forward kinematic model when the robot moves a large distance in Cartesian space and robot joint space, the recorded robot position and orientation associated with the hole location detected from point cloud data of frame, where robot positioned the 3D sensor for scanning, can absorb the error of the robot forward kinematic model since the robot scanning position is close to the detected hole location.

As noted above, the technique of the present disclosure may be employed in the robotic charging application in mining. For example, a task of the robot may include, in addition to imaging as described above, inserting the explosive material pump hose into the holes drilled in the wall. In order to accurately position the tip of a pump hose into a hole, the robot system desirably needs to detect the holes such as hole position and hole orientation.

For example, a statistical model of hole location prediction may be applied to estimate the certainty of the hole detection result so that the 3D sensor may be reoriented around the candidate hole to scan it from the different angles, detect the hole from the 3D point cloud of each frame and analyze the hole detection result over these frames. Thus, employing feedback regarding the quality of the data over the localized scanning or region of interest may improve the hole detection robustness to reduce false positives and negative detection. In addition, the accuracy of the hole detection may be improved on both position and orientation estimation. If the hole detection result is verified, both the hole location relative the sensor frame and robot base frame, and the robot scanned position and orientation are recorded.

Also, a generally simultaneous scanning and localized detection parallelizes the two processes and reduces the cycle time. Moreover, the detection algorithm may only need to process the point cloud data in one frame compared to the larger data required of merging the whole or entire wall scanning data from different angles.

As described above, in one embodiment. the robot scanning of the rock wall may be generally perpendicular and generally parallel to the rock wall and the interspersing of the localized scanning of the holes uses a technique such as panning and/or tilting a 3D sensor to scan the holes and the sides of the inside of the holes. This so called combined scanning may be quick with a generally low resolution scan of the environment away from the holes and a generally higher resolution of and adjacent to the holes, for example, using a 3D sensor providing a point cloud of the environment. The point clouds in each frame from the 3D sensor may be merged to reconstruct the 3D scene. The detected holes may be registered to a drilling map shown in FIG. 2 for wall 16. Using a 2D sensor and image processing in the harsh environment in mining such as uncontrolled lighting condition, dust, water, etc. may not produce desirable results. This can be overcome by as described herein, using in the present technique a 3D sensor and a 3D point cloud processing system.

In addition, the technique of the present disclosure may include the robot adjusting the 3D sensor scanning path based on the hole detection during the localized scanning to improve the observability and the quality of point cloud of the hole from the scanning. The system scanning of the wall and detection of the hole may be generally simultaneous with the hole detected and verified during continuous scanning. The robot scanning parameters (speed, tool orientation, resolution, etc.) and path may be adapted to the hole detection. This may provide the high quality of point cloud data of the localized area where the hole appears.

The present technique of a combined scanning path with localized scanning of the holes may overcome inaccuracies in the location of the detected holes compared to a single detailed whole wall scanning which may include inaccuracies from two sources, one being the merging the scanning data of each frame from 3D sensor and the other being the error of robot forward kinematics, that is, the computed position of the robot end effector 110 from specified values for the robot's joint parameters.

As noted above, a robotic system employing the techniques of the present disclosure may also be employed with or be a part of a robotic system providing 3D visual servoing to accurately position the hose at the entrance of each drill hole. For example, an end of arm tooling may handle the hose, i.e., push the hose forward and retract the hose back, as well as rotate the hose to overcome obstructions in the hole during hose insertion. Such a robotic system may include a magazine for automating prime to detonator assembly, remote teleoperation to intervene the automated charging process, and record and report the status of the each charging hole. Benefits of such a robotic system may include making the charging process safer, ergonomic, and cost efficient by removing operators from the production front. Additional functions may include remotely supervising the chagrining process, and monitoring the production by measuring front wall geometric changes.

With reference again to FIG. 3, FIG. 3 depicts an example system 100 to incorporate and use aspects described herein. System 100 includes robot 102, robot controller 150, operator computer system 170, and backend computer system 160, all coupled via communication links 140a-140d. The physical locations of these components relative to one another can vary. For instance, they may be as close together as a few feet or as far apart as thousands of miles or more.

Communication links 140a-140d between the components may be realized by any of various wireless and/or wired technologies (e.g. fiber-optic/radio/cable on different types and layers of data protocols). In some embodiments, one or more such communication links includes existing infrastructure, such as existing Ethernet installations operating over one or more local or wide area network(s). A non-limiting list of additional communication link technologies includes wireless-LAN (WLAN), Bluetooth, ZigBee, near-field, or other wireless links, point-to-point radio systems or laser-optical systems, and satellite communication links, as examples.

Robot 102 may be any type of robot, such as an industrial robot offered by ABB Inc. of Auburn Hills, Mich., U.S.A., as an example. Example robots have several (usually 4, 5, 6 or 7) degrees of freedom enabling them to perform any of various tasks usually characterized by the movement and/or manipulation of objects. In this regard, a robot refers in its broadest sense to an assembly that has multiple degrees of freedom.

Robot functions are served by different, and typically application-specific, components, some of which are depicted as part of the example robot 102 of FIG. 3. It should be understood that robot 102 includes additional components omitted from FIG. 3 for convenience purposes, and further that a robot to incorporate/use aspects described herein need not necessarily include each of the components depicted in FIG. 3.

Camera system 104 provides imaging functions enabling the robot to 'see' physical objects in its environment. Camera system 104 may be realized by proprietary and/or application-specific imaging device(s) or commercial off-the-shelf (COTS) offerings providing 2-dimensional, 3-dimensional, and/or depth-sensing imaging capabilities. An example COTS product is the Kinect® motion controller offered by Microsoft Corporation. Vision assistance system 106 is another type of sensor system providing vision capabilities for the robot. It can also include imaging device(s) for imaging objects of the environment to assist in proximity or other spatial determinations. In some embodiments, the camera system 104 is mounted on the robot at or near a 'head' thereof providing a roughly $1^{st}$-person perspective of the robot's activities, while the vision assistance system 106 includes multiple cameras mounted around the robot 102 and imaging the robot 102 and its surroundings to provide a $3^{rd}$-person perspective of robot activities with respect to the surrounding objects.

Other sensor/sensor devices 108 are included to provide additional sensing capabilities. The particular additional sensors may be dependent on the types of tasks the robot will perform when in operation. A non-limiting list of additional sensors are microphones, position sensors, proximity sensors, and force/pressure sensors, as examples. Some sensor devices can include data processing capabilities. So-called smart sensors are usually, though not always, connected directly to robot controller 150 via communication link(s). Other types of sensors that lack on-board data processing capability to process captured data may provide data to a separate data processing device (such as robot controller 150, backend computer system 160, operator computer system 170, and/or another computer system, not pictured) to process the sensor device output.

Some sensors may be local to or remote from the robot 102 or robot controller 150. Remote sensor devices can provide input signals to the robot controller 150 that the robot controller 150 uses to control the robot 102 in performance of work described herein.

Some sensors that are mounted either on the robot 102 or at other locations can detect, or provide data that is processed to detect, obstacles that enter into or otherwise appear in the workspace of the robot 102. Sensor information including data about the detected obstacle can be processed and used by robot controller 150 for position and other geometric information. With respect to a smart sensor, a data processing capability thereof can fully or partially process sensor information and transfer to the robot controller 150 only the relevant data about the obstacle. In other types of sensors that lack data processing capability, the sensor information can be processed by another data processing device as described above and provided to robot controller 150.

The robot 102 can also include actuator(s) or other devices (collectively referred to as actuation devices 110) incorporated into, mounted to, or next to, the robot 102 to provide object manipulation capabilities for manipulating or moving objects. Example actuation devices 110 include grippers, claws, fixtures, suction devices, conveyors, twisting mechanisms, hose and/or wire feeder mechanisms, and specialized equipment like medical tools, welding guns, or spraying guns. Many actuation devices are more generally referred to as robot "end effectors".

Robot controller 150 provides motion data to robot 102 to control actions thereof. Motion data includes commands, as examples, sent to and received by component(s) of the robot that cause the components to drive robot actions, movement to other locations, and other activities. Accordingly, robot controller 150 may be a computer system having programs (i.e. instructions, program code) that execute to provide motion data to the robot 102 to control motion of the robot 102 to perform work. For instance, the robot 102 may hold a tool (not shown) used to perform work on a stationary or moving workpiece (also not shown), or may hold the workpiece to have work performed on it by an appropriate tool, as examples. As further examples, the robot 102 may include a feeder component to feed a hose or other object into holes or other spaces to accomplish a task such as planting explosive material. The feeder component may include a twisting mechanism configured to twist the hose or other object in order to more reliably reach desired locations.

Sensor information provided to the robot controller 150 directly or indirectly, such as via a data processing component to process sensor data, may be used to generate a safety zone in which the robot 102 may work. When obstacles enter into the workspace of the robot 102 based on repositioning the obstacle or the robot, a map can be built to inform the robot controller 150 of the safety zone. Additionally, information from sensor(s) or other components, such as components 104, 106 and/or 108, can be used by the robot controller to build a distance map and/or ⅔-dimensional map. In some examples, raw sensor information is processed to build the map.

Robot controller 150 is in communication with operator computer system 170 used in controlling and/or observing robot behavior. The operator computer system 170 can show on a display thereof actual data about robot motion and attached processes, for example, camera images, acoustic feedback, and sensor values. Additionally, operator computer system 170 can act as a data processing device for sensor information, and can process data in both directions (i.e. data to/from the sensors). Operator computer system 170 may be implemented by any computer system desired, for instance an industrial personal computer or a programmable logic controller, as examples.

Some embodiments may feature at least partial control of the robot 102 by operator computer system 170. The operator computer system 170 can play a role in dictating, selecting, building, and/or providing commands or other signals to the robot 102 and/or robot controller 150 to cause the robot 102 to perform actions. In some examples, the operator computer system 170 has at least one teleoperation input device, such as joysticks or stylus-type devices that the operator can use to create continuous motion signals (position and/or speed signals) that can be provided to the robot 102 directly or via robot controller 150. Some teleoperation input devices can provide feedback to an operator based on, for example, input from sensors of the robot 102. Feedback can be any kind of feedback that can be sensed by an operator. An example is haptic or force feedback that causes a vibration in a joystick or a stylus.

The operator computer system can also include a safety enable device, such as a three-position switch, to provide the ability for the operator to enable or disable power to the robot 102 and/or other components of the system 100.

Backend computer system 160 can provide additional local or remote computing resources to support robot controller, operator computer system 170, and/or robot 102. In this regard, control of the robot 102 and/or other processes supporting robot tasks may be more demanding than can be handled by the front-end systems. A local or remote backend facility may be provided by backend computer system 160, and the front-end components can off-load work to the backend computer system 160. By way of specific example, processing of image data, especially 3-dimensional image data, may present a significant burden on the robot 102, sensors thereof, and/or robot controller 150. The image data may be provided in part or whole to backend computer system 160 for processing and results can be provided back to the robot controller 150 or another component for use in robot processes.

As mentioned prior, components of system 100 need not be located adjacent to each other. Backend computer system 160 may be located on-site or offsite, for instance as a remote cloud-based computing facility that offers a web-based data-processing solution.

One or more of the foregoing components of system 100 may be encompassed by, or included in, one or more other of the foregoing components. Similarly, functionality described above of a given component may be incorporated into a different component of the foregoing components. Backend compute resources provided by backend computer system 160, for example, may be included in the robot controller 150 or operator computer system 170, or vice versa. In some embodiments, functionality of robot controller 150 and/or operator computer system 160 is incorporated into backend computer system 160.

Figure 12:
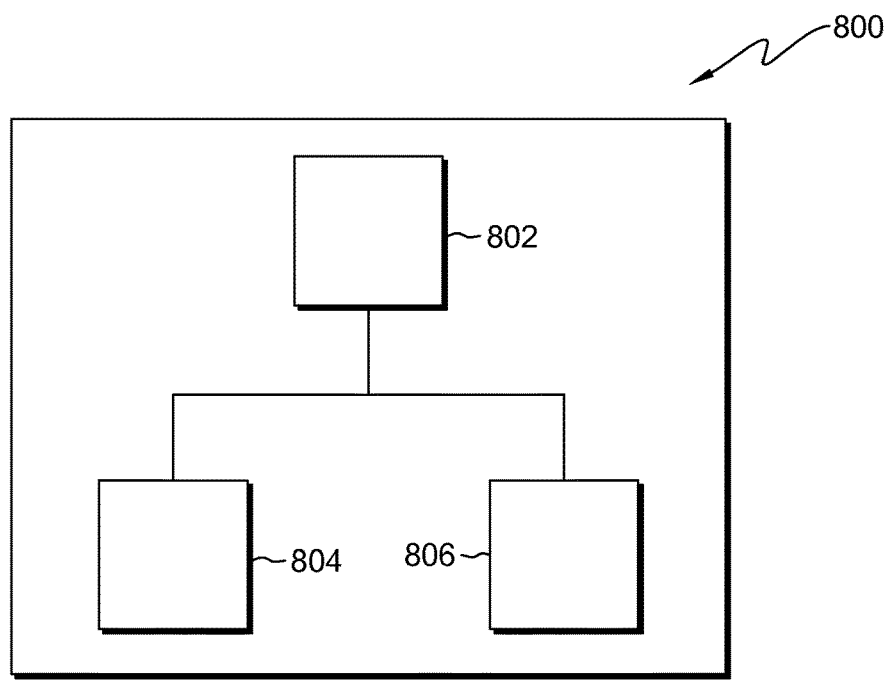
FIG. 12 depicts a computer system incorporating one or more aspects of the present disclosure.

Processes described herein may be performed by one or more computer systems or other processing devices. An example computer system to incorporate and use aspects described herein is depicted and described with reference to FIG. 12. Computer system 800 includes one or more processors 802, memory 804, and one or more I/O devices 806, which may be coupled to each other by busses and other electrical hardware elements (not depicted). Processor(s) 802 include any appropriate hardware component(s) capable of implementing functions, for instance executing instruction(s) (sometimes alternatively referred to as code, firmware and/or software) retrieved from memory 804. Execution of the instructions causes the computer system 800 to perform processes, functions, or the like, such as those described herein supporting control and/or operation of a robot.

In some examples, aspects described herein are performed by a plurality of homogenous or heterogeneous computer systems coordinated to collectively perform processes, functions, or the like, such as those described herein supporting control and/or operation of a robot.

Memory 804 includes hardware components or other storage devices to store data such as programs of instructions for execution, and other data. The storage devices may be magnetic, optical, and/or electrical-based, as examples. Hard drives, field-programmable gate arrays (FPGAs), magnetic media, compact disks (CDs), digital versatile disks (DVDs), and flash memories are example storage devices. Accordingly, memory 804 may be volatile, non-volatile, or a combination of the two. As a specific example, memory 804 includes one or more hard drives and one or more random-access memory (RAM) devices for, respectively, non-volatile and volatile storage of data. Example programs stored by memory include an operating system and applications that run on the operating system, such as specialized applications to perform functions described herein.

I/O device(s) 806 include hardware and/or software components that support input and output of data to/from computer system 800. I/O device(s) 806 include physical components that attach physically or wirelessly to the computer system and/or integrate into the computer system, such as keyboards, mice, display devices, joysticks, camera devices, compact disks, thumb drives, printers, global positioning system (GPS) devices, gyroscopes, magnetometers, light sensors, proximity sensors, microphones, speakers, or accelerometers, as examples. I/O devices 806 also include, but are not limited to, I/O controllers and hardware and software supporting data communication with the aforementioned components, such as network, graphics, and/or audio controller(s). An example I/O device 806 is a network adapter for communication of data between computer system 800 and another component, such as another computer system, across communication links. Examples include Ethernet, cable, and/or fiber-based communications links passing data packets between computer system 800 and other systems across one or more networks, such as the Internet. Other example I/O devices 806 include universal serial bus (USB), peripheral component interconnect (PCI), and serial adapters/interfaces configured to couple to devices of their respective kind.

A non-limiting list of example computer systems includes: personal computers (PCs), laptops, workstations, servers, mainframes, network appliances, virtualization devices, computing terminals, personal digital assistants, cellular telephones and smartphones, wearable devices ("wearables"), tablet computers, and sensors such as cameras or camera systems.

Figure 13:
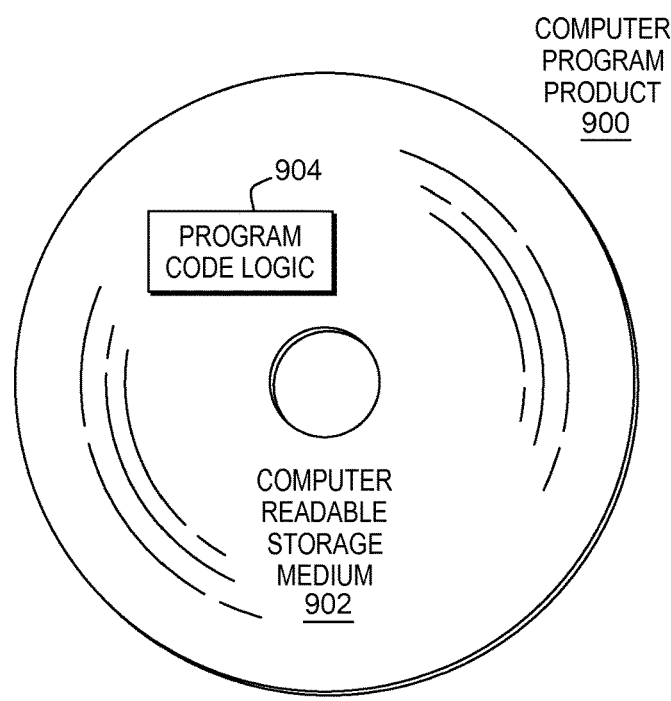
FIG. 13 depicts a computer program product incorporating one or more aspects of the present disclosure.

Accordingly, aspects described herein may take the form of one or more systems, methods/processes, and/or a computer program products. A computer program product may be a computer-readable, tangible storage medium or device that stores instructions. In some embodiments, the computer program product is non-transitory computer readable storage media. Referring to FIG. 13, an example computer program product 900 is depicted that includes, for instance, one or more computer readable storage media 902 to store computer-readable program code means, logic and/or instructions 904 thereon to provide and facilitate one or more embodiments described herein.

A computer-readable storage medium can be, as examples, electronic, magnetic, electromagnetic, optical, and/or semi-conductor-based. Examples include but are not limited to: random access memory, read-only memory, computer disks, flash memory, and optical storage media like compact disks (CDs) or digital versatile disks (DVDs). As specifically used herein, computer-readable storage media does not per se consist of transitory signals, such as radio waves or other propagating signals.

Program code contained or stored in/on a computer readable storage medium can be obtained and executed by a computer system (computer, processing system, data processing system, etc. including a component thereof) and/or other device to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects described herein may be written in one or more programming languages. In some embodiments, the programming language(s) include object-oriented and/or procedural programming languages such as C, C++, C#, Java, etc. Program code may execute entirely or partially on the computer system, a remote computer system, or a combination of partially on the computer system and partially on a remote computer system.

Program code can include program instructions obtained for execution by processor(s). Computer program instructions may be provided to processor(s) of, e.g., a computer system, to produce a machine, such that the program instructions, when executed by the processor(s), perform, achieve, or facilitate aspects described herein, such as actions, processes, or functions described in flowcharts and/or block diagrams described herein. Thus, each block, or combinations of blocks, of the flowchart illustrations and/or block diagrams depicted and described herein can be implemented, in some embodiments, by computer program instructions. Behaviors/functions specified or performed by one or more blocks may occur in a different order than depicted and/or described, or may occur simultaneous to, or partially/wholly concurrent with, one or more other blocks.

The terminology used herein is for the purpose of describing particular embodiments only and is not limiting of the invention. As used herein, the singular forms "a", "an" and "the" include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not presented.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

The invention claimed is:

1. A computer-implemented method comprising:
scanning an environment along a scanning path;
interspersing a plurality of localized scanning of a plurality of candidate features in the environment during the scanning along the scanning path of the environment, the interspersed localized scanning of the plurality of candidate features in the environment being different from the scanning the environment along the scanning path; and
obtaining a representation of at least a portion of the environment based on the scanning of the environment and the interspersed localized scanning of the plurality of candidate features in the environment,
wherein interspersing the plurality of localized scanning of the plurality of candidate features includes:
generating a set of data corresponding to one candidate feature of the plurality of candidate features by scanning one candidate of the plurality of candidate features a plurality of times,
determining the one candidate of the plurality of candidate features exceeds a certainty threshold using the set of data,
recording the candidate location, a robot location, and a robot end effector orientation in response to the determining, and
updating a robot forward kinematic model for the robot end effector using the recorded robot location and robot end effector orientation.

2. The computer-implemented method of claim 1 wherein the interspersing the plurality of localized scanning of the plurality of candidate features in the environment comprises identifying one of the plurality of candidate features during the scanning of the scanning path of a first portion of the environment, scanning a localized portion of the environment having the identified one of the plurality of candidate features in the first portion of the environment, continuing the scanning along the scanning path of the environment another portion of the environment, identifying another one of the plurality of candidate features during the scanning of the scanning path of the another portion of the environment, and scanning another localized portion of the environment having the identified another of the plurality of candidate features in the another portion of the environment.

3. The computer-implemented method of claim 1 wherein the scanning along the scan path of the environment is at a first resolution or speed and the scanning of the localized portions of the environment is at a second resolution or speed different from the first resolution or speed.

4. The computer-implemented method of claim 1 wherein the scanning of the environment along the scanning path is performed using a first scanning parameter, the interspersing comprises using at least one criteria for identifying the plurality of candidate features along the first scanning path, and the scanning of the localized portions is based on the plurality of identified candidate features and performed using a second scanning parameter different from the first scanning parameter.

5. The computer-implemented method of claim 1 wherein the scanning along the scanning path employs a 3D imager and the scanning the localized portions employs the 3D imager.

6. The computer-implemented method of claim 1 wherein the obtaining the representation comprises obtaining a first plurality of frames of data of the scanning along the scan path of the environment and a plurality of frames of data of the localized portions of the plurality of candidate features of the environment, and merging together data from the first plurality of frames of data of the scanning along the scan path of the environment and the plurality of frames of data of the localized portions of the plurality of candidate features of the environment.

7. The computer-implemented method of claim 1 wherein the scanning the environment along the scanning path comprises updating the statistical model of feature location prediction based on prior feature detection results, and estimating a certainty of a current detected feature using the updated statistical model of feature location prediction and a current feature detection result, and wherein the obtaining the representation of the interspersed localized scanning of the plurality of candidate features in the environment is based on the estimated certainty of the current detected feature being above a threshold.

8. The computer-implemented method of claim 1 wherein the scanning along the scan path comprises scan across a plane.

9. The computer-implemented method of claim 1 wherein the scanning the localized portions comprises scanning the localized portions from a plurality of orientations.

10. The computer-implemented method of claim 1 wherein the scanning along a scan path and the scanning of the localized portions comprises employing a robotically supported movable imager.

11. The computer-implemented method of claim 1 wherein the environment comprises a rock wall and the plurality of candidate features comprise a plurality of elongated holes defining axes for receiving charges for mining.

12. The computer-implemented method of claim 11 wherein the scanning the wall along the scanning path comprises updating the statistical model of feature location prediction and a drilling map matching based on prior hole detection results, and estimating a certainty of a current detected hole using the updated statistical model of feature location prediction, the updated drilling map matching, and a current hole detection result, and wherein the obtaining the representation of the interspersed localized scanning of the plurality of holes in the wall is based on the estimated certainty of the current detected feature being above a threshold.

13. The computer-implemented method of claim 11 further comprising determining orientations of the axes of the plurality of holes based on the scanning of the localized portions.

14. A system comprising:
a memory; and
a physical processor in communications with the memory, wherein the system is configured to perform a method, said method comprising:
scanning an environment along a scanning path;
interspersing a plurality of localized scanning of a plurality of candidate features in the environment during the scanning along the scanning path of the environment, the interspersed localized scanning of the plurality of candidate features in the environment being different from the scanning the environment along the scanning path; and
obtaining a representation of at least a portion of the environment based on the scanning of the environment and the interspersed localized scanning of the plurality of candidate features in the environment,
wherein interspersing the plurality of localized scanning of the plurality of candidate features includes:
generating a set of data corresponding to one candidate feature of the plurality of candidate features by rescanning around one candidate of the plurality of candidate features,
determining the one candidate of the plurality of candidate features exceeds a certainty threshold using the set of data,
recording the candidate location, a robot location, and a robot end effector orientation in response to the determining, and
updating a robot forward kinematic model for the robot end effector using the recorded robot location and robot end effector orientation.

15. A non-transitory computer readable storage medium readable by a processor comprising:
instructions stored on the non-transitory computer readable storage medium for execution by the processor for performing a method comprising:
scanning an environment along a scanning path;
interspersing a plurality of localized scanning of a plurality of candidate features in the environment during the scanning along the scanning path of the environment, the interspersed localized scanning of the plurality of candidate features in the environment being different from the scanning the environment along the scanning path; and
obtaining a representation of at least a portion of the environment based on the scanning of the environment and the interspersed localized scanning of the plurality of candidate features in the environment,
wherein interspersing the plurality of localized scanning of the plurality of candidate features includes:
generating a set of data corresponding to one candidate feature of the plurality of candidate features by reorienting around one candidate of the plurality of candidate features,
determining the one candidate of the plurality of candidate features exceeds a certainty threshold using the set of data,
recording the candidate location, a robot location, and a robot end effector orientation in response to the determining, and
updating a robot forward kinematic model for the end effector using the recorded robot location and robot end effector orientation.

16. The computer-implemented method of claim 1 wherein interspersing the plurality of localized scanning of the plurality of candidate features includes:
generating a second set of data corresponding to a second candidate feature of the plurality of candidate features by scanning the second candidate of the plurality of candidate features a plurality of times,
determining the second candidate of the plurality of candidate features is a false positive detection using the second set of data, and
updating a statistical model of feature location prediction using feedback including the second set of data corresponding to the false positive detection in response to determining the second candidate of the plurality of candidate features is a false positive detection.

* * * * *